April 28, 1964 P. A. MORGAN 3,130,921
VEHICLE LAMP MOUNTING
Filed Sept. 13, 1961 2 Sheets-Sheet 1
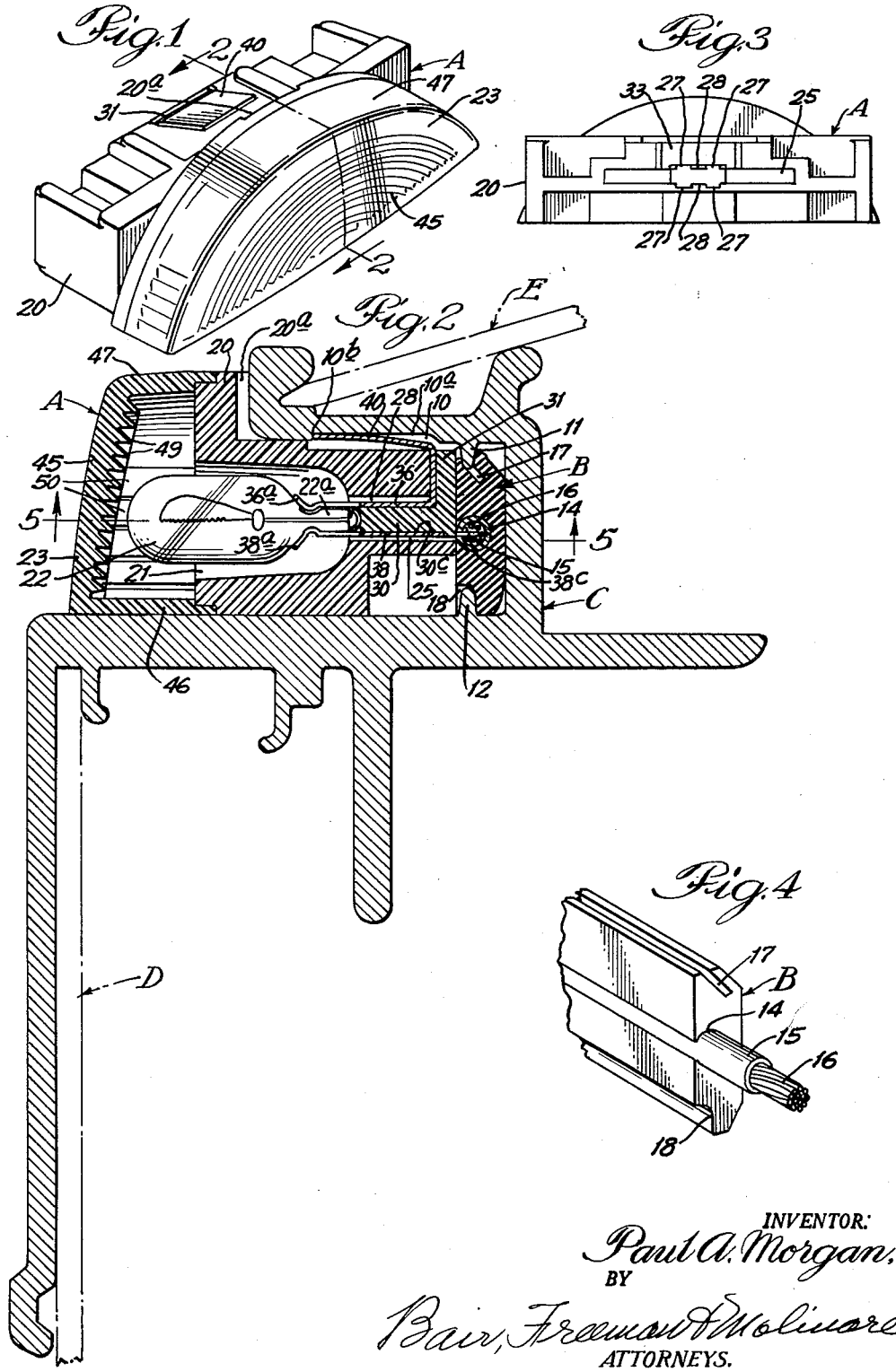
INVENTOR:
Paul A. Morgan,
BY
Bair, Freeman & Molinare
ATTORNEYS.

April 28, 1964  P. A. MORGAN  3,130,921
VEHICLE LAMP MOUNTING
Filed Sept. 13, 1961  2 Sheets-Sheet 2
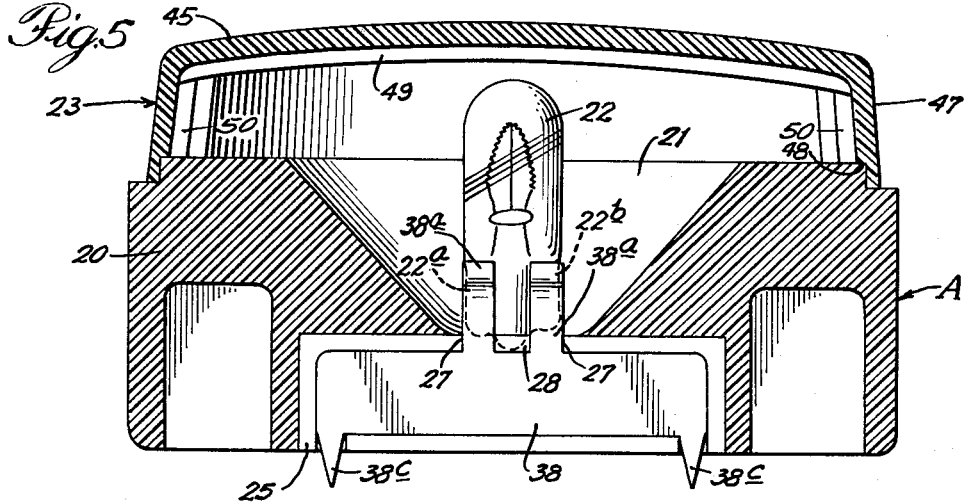
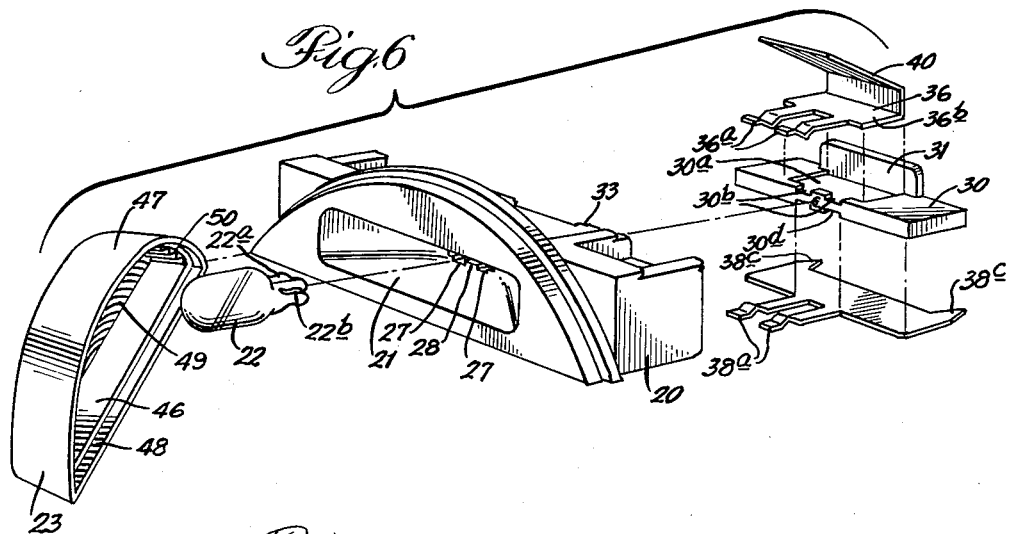
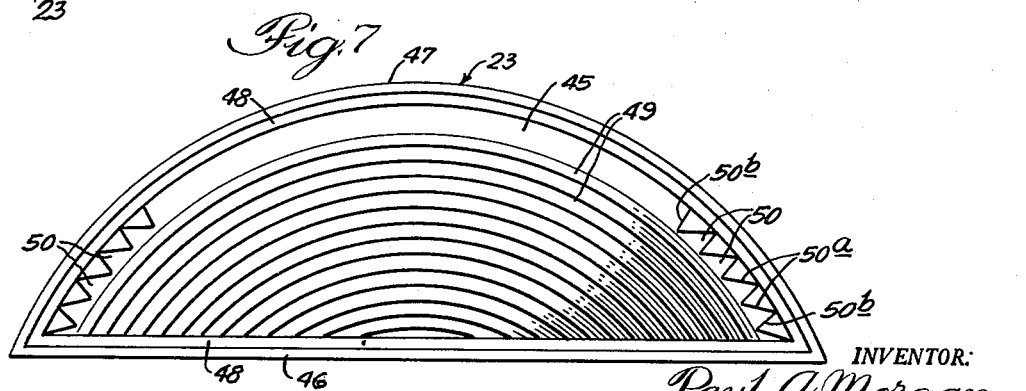
INVENTOR.
Paul A. Morgan,
BY
Bair, Freeman & Molinare
ATTORNEYS.

United States Patent Office 3,130,921
Patented Apr. 28, 1964

3,130,921
VEHICLE LAMP MOUNTING
Paul A. Morgan, Chicago, Ill., assignor to King Bee Manufacturing Co., Bellwood, Ill., a corporation of Illinois
Filed Sept. 13, 1961, Ser. No. 137,859
7 Claims. (Cl. 240—8.2)

The present invention relates to a novel form of light unit for use in connection with a conductor strip of the type sometimes referred to as a "bus bar." Light units of the type embodying the present invention are capable of numerous uses, and are especially suitable for use as identification and clearance lights as part of a lighting system for road vehicles, such as trucks, trailers, semi-trailers, and buses.

As is well known, highway vehicles, such as trucks, trailers, semi-trailers and buses, must be provided with specific lighting systems that comply with the rigid requirements of the Interstate Commerce Commission. Among such requirements for lighting of vehicles, are specific designations as to size, location, and color of lenses, of both identification and clearance lights. Such lights as heretofore available for use as identification and clearance lights are more or less of conventional type, and when a lamp bulb of such a light is burned out or the unit is damaged while the vehicle is in transit, it is usually difficult and inconvenient to replace the lamp bulbs or repair or replace complete light units. The specific type of lamp bulbs required, and sometimes even complete light units, are not always readily obtainable, along with the services of a mechanic, at the majority of service stations along the highways. It is highly desirable, therefore, that light units utilized as identification and clearance lights be of a form and character which will enable an operator to quickly and easily mount an additional light unit in a proper position on the vehicle without the necessity of seeking replacement parts, or a special mechanic, all of which would result in delay in transit of the vehicle.

One of the objects of the present invention is to provide an improved unitary light unit which may be quickly and easily mounted in operative relation without requiring the use of any tools whatsoever.

Another object is to provide an improved light unit adapted for cooperative use with a conductor strip, and wherein the light unit is caused to be securely latched in operative position in a manner to preclude unauthorized removal or pilfering, and which requires destruction of parts of the unit in order to permit removal of the light unit from its mounting.

A further object is to provide an improved light unit for cooperative use in connection with a conductor strip and a frame member of the body of a vehicle, and which is constructed and arranged to permit quick and easy installation without use of any tools, and the light unit is caused to be securely attached in position so as to preclude its removal intact.

Still another object is to provide an improved light unit which is constructed and arranged so as to be waterproof and will also preclude dust and dirt from entering the unit.

A still further object is to provide an improved light unit which is composed of relatively few parts, is extremely simple in construction and in assembly, durable in use, and which is sufficiently inexpensive to manufacture as to make it economically practical to totally discard and replace a light unit when parts thereof become worn out or damaged.

Other objects and advantages of this invention will be apparent from the following description, taken in connection with the accompanying drawings, in which, FIGURE 1 is a perspective view of the light unit embodying the present invention;

FIGURE 2 is an enlarged, vertical sectional view through the light unit, taken as indicated at line 2—2 on FIGURE 1, shown mounted in operative relation to a conductor strip and a body frame member of a vehicle;

FIGURE 3 is a rear elevational view of the body of the light unit;

FIGURE 4 is a fragmentary perspective view of a conductor strip which may be used in connection with the present invention;

FIGURE 5 is a horizontal, sectional view through the lamp unit, taken as indicated at line 5—5 on FIGURE 2;

FIGURE 6 is an exploded view showing in perspective all of the separate components of the total light unit; and FIGURE 7 is a rear view of the lens of the light unit.

The light unit embodying the present invention, indicated generally at A, is of a form and construction which lends itself for use in connection with a single wire type of conductor strip, indicated generally at B, and a metallic frame member indicated generally at C, constituting a part of a vehicle body. It will be manifest that the light unit includes various constructional features which may be slightly modified so as to permit its adaptation and use in various other environments.

As seen in FIGURE 2 of the drawings, the light unit is in operative association with the conductor strip B, and the frame member C. The frame member C is preferably in the form of a metallic extrusion, adapted to constitute the upper, outer frame structure for a vehicle body. The frame member is formed with a laterally open, elongated channel 10, and in the rearward portion of the upper and lower surfaces of the channel there is provided a pair of oppositely extending ribs 11 and 12, for cooperation with the conductor strip B. The conductor strip includes a body of suitable material, such as plastic or rubber, and is of generaly flattened, elongated form in cross-section, and is formed intermediate its height in its front surface with a longitudinal groove or recess 14, in which is fitted an insulated type of single conductor wire 15, with the core or conductor thereof preferably being of multi-filament type, as indicated at 16. The upper edge of the conductor strip is formed with a slot 17, for cooperative engagement with the upper rib 11 in the channel of the frame member and the bottom front surface of the conductor strip is recessed, as indicated at 18, for accommodating the rib 12 provided on the lower wall of the channel 10 of the frame member. The frame member is adapted to provide a support and connection for the outer walls of a vehicle body, including vertical side wall panels, as indicated diagrammatically at D, and roof panels, as indicated diagrammatically at E.

The light unit includes a generally elongated body 20, preferably molded of suitable material possessing electrical insulating characteristics. The front surface of the body is formed with an outwardly open cavity 21, for the accommodation of a light bulb 22 therein. The upper part of the front portion of the body is of arcuate contour corresponding generally to the contour of a lens 23. The rear portion of the body 20 is formed with an elongated slot 25, which opens in direct communication with the cavity 21, as seen in FIGURE 5 of the drawings. Other portions of the body are suitably cored for effecting a saving of material utilized. Each of the top and bottom surfaces of the slot 25 are formed with two transversely spaced apart grooves 27, as seen in FIGURE 3, providing ribs 28 therebetween.

An elongated plug 30, of suitable material possessing electrical insulating characteristics, is adapted to be fitted into said slot 25 of the body, and includes at its outer or rear portion an upstanding projection or lug 31, adapted to be seated in a vertical recess 33, formed in the back surface of the body, so that the outer surface of the plug 30, when it is mounted in operative position in the body, is substantially flush with the rear outer surface of the body.

A pair of contact members 36 and 38 are adapted to be interfitted into opposite main surfaces of the plug 30, so that the three parts may be telescoped as an assembly into the slot 25 of the body. Each of the contact members includes a pair of transversely, spaced apart resilient fingers, as indicated at 36a and 38a respectively, which are adapted, when the conductor members are positioned within the body as seen in FIGURE 2, to extend into the cavity 21 of the body and provide an elongated type of lamp socket for the reception of a flattened base 22a, of the lamp bulb 22. The base of the lamp bulb is provided on opposite faces with a pair of spaced apart contact wires 22b, each of which is adapted to be resiliently engaged by one of the flexible fingers 36a or 38a of the contact members, and the spring pressure of said fingers serves to securely and firmly support the bulb in position.

The upper surface of the plug 30 is formed with a rectangular recess 30a, for accommodating a correspondingly shaped portion 36b of the contact member 36, and spaced notches 30b for fingers 36a, to preclude lateral shifting of said contact member with respect to the plug. Said contact member 36 also includes an upwardly and reversibly bent resilient portion 40, as seen in FIGURES 2 and 6 of the drawings. The contact members are formed of resilient electrical conducting material, and the portion 40 of the contact member 36 constitutes a resilient latch member, as will hereinafter be described. The under side of the plug 30 is provided with a recess 30c, corresponding to the shape of the main body portion of the contact member 38, and spaced notches 30d for fingers 38a preclude lateral shifting of said contact members 38, with respect to said plug 30. When the contact members, together with the plug 30, are assembled, it is preferred that a suitable adhesive or solvent for either the material of the body, or the plug, be applied either around the plug or the inner surfaces of the slot 25, to seal the parts in final assembled position to preclude the entrance of moisture, dust and dirt within the light unit.

When contact members 36 and 38, are assembled together with the plug 30, and are projected into the slot 25 of the body, the finger portions 36a and 38a of the contact members are partially seated in the grooves 27 formed in the top and bottom walls defining the slot 25 of the body, and by virtue of which the contact members are interconnected to the body and the plug 30 to preclude lateral shifting of the contact members out of position.

The contact member 38 is provided with a pair of rearwardly extending barbs or prongs 38c, which project rearwardly from the body 20 and adapted, when the light unit is mounted in the channel 10 of the frame member C, to be projected through the insulated cover 15 of the conductor wire, into direct contact with the filament core 16 of said wire, as clearly seen in FIGURE 2 of the drawings.

The under surface of the top wall constituting the channel 10 of the vehicle body frame member C, is recessed, as indicated at 10a, to provide an abutment shoulder 10b, against which the free edge of the latch portion 40 of contact member 38 is caused to abut to securely latch the light unit in operative position to the frame member C, as seen in FIGURE 2 of the drawings. Because of the location of the abutment shoulder 10b and position of latch member 40 when the light unit is in place, it is not possible to disengage the latch and, hence, the light unit cannot at any time be removed intact from its mounted position.

The lens 23 is preferably molded of suitable plastic material and, as may be seen in the drawings, in general is in the form of a section of a hollow cylindrical disc, having a front wall 45, a bottom wall 46, and an arcuate top wall 47, the top wall extending continuously in an arc to the opposite ends of the bottom wall 46. The rear edges of the top and bottom walls of the lens are rabbeted, as indicated at 48, and the front surface of the body 20 is similarly shouldered to provide a telescopic fit of the lens with respect to the body, so that the lens serves as a cover for the cavity 21, and encloses the lamp bulb 22. Preferably, the juncture of the lens and the body are adhesively united to provide a seal for excluding dust, dirt and moisture from the lamp unit.

The cavity 21 opening to the front of the body 20 is of outwardly flaring formation, as seen in FIGURES 5 and 6, so as to permit maximum distribution of the light rays from the lamp bulb 22. The inner surface of the front wall 45 of the lens is formed with a series of concentrically arranged, arcuate grooves 49, defining light refracting surfaces. The inner surface of the arcuate top wall of the lens, adjacent opposite lower ends, is formed with a series of spaced apart grooves 50, also defining light refracting surfaces. Preferably, the grooves 50 extend upwardly from the bottom wall 46 for only a portion of the arcuate extent of the top wall. It has been found that excellent light refracting results are attained by so forming the grooves 50 as to provide flat surfaces 50a extending in the same general direction as the bottom wall 46 of the lens, and with the adjacent surfaces 50b disposed at an angle of approximately 30° to vertical. By virtue of the arrangement of the grooves in the inner surfaces of the lens, they serve to confine and intensify the light rays for increasing the effectiveness of the light unit.

It is to be understood that in the construction herein disclosed the frame member C is connected to the vehicle chassis so as to constitute a ground in the electrical circuit of the lighting system of the vehicle, and which circuit is completed through the contact members 36 and 38 to the lamp bulb by virtue of the connection of the contact member 38 to the conductor wire 16 of the conductor strip constituting the other part of the circuit of the lighting system.

The construction of the light unit embodying the present invention is such that, when the unit is mounted in operative position, as seen in FIGURE 2 of the drawings, it is not possible to ever remove the light unit intact from its mounting. In the event of burn-out of a lamp bulb, or damage to a light unit, another complete unit may be quickly and easily installed without the use of tools, immediately alongside of the worn out or damaged unit, or the worn out or damaged unit may be removed by destroying it. For convenience in effecting destruction of the unit, the top surface of the body 20 is formed with a slot, as indicated at 20a, so as to permit the insertion of a suitable implement, such as a screw driver, to facilitate rupturing and removal of the lamp unit.

The lamp unit embodying the present invention is composed of relatively few parts, and is extremely inexpensive to fabricate and assemble. Hence, it is economically practical to totally discard a damaged or worn out light unit and replace it with an entire new unit. By virtue of the construction of the improved light unit, inconvenience and delay in transit of road vehicles of the type heretofore referred to, as a result of burn-out of a lamp bulb, or damage to one or more light units, is greatly minimized or eliminated.

Although I have herein shown and described a certain preferred embodiment of my invention, manifestly it is capable of modification and rearrangement of parts without departing from the spirit and scope thereof. I do not, therefore, wish to be understood as limiting this invention to the precise embodiment herein disclosed, except as I may be so limited by the appended claims.

I claim:
1. In a lighting system for a road vehicle having a body supported on wheels, the combination of an elongated, metal frame member constituting the ground for the circuit for the lighting system, said member being formed with a laterally open channel, an elongated conductor strip seated in the bottom of the channel and having a conductor wire carried thereby, the channel portion of the frame member being formed to provide a latch shoulder, a unitary light unit mounted in the channel and having a body of insulating material, the front of said body being formed with a laterally open cavity, a lamp bulb positioned in the cavity, two contact members carried by the body and formed with cooperating portions extending into said cavity and forming a socket which supports the lamp bulb, one of the contact members having a portion extending rearwardly of the body engaging the conductor wire of the conductor strip, a lens connected to the body for covering the cavity and enclosing the lamp bulb, and a resilient latch member carried on the body and abutting against said shoulder on the frame member, when the light unit is mounted in the channel, to preclude removal of the light unit, intact, from the frame member.

2. In a lighting system for a road vehicle having a body supported on wheels, the combination of an elongated, metal frame member constituting the ground for the circuit for the lighting system, said member being formed with a laterally open channel, an elongated conductor strip seated in the bottom of the channel and having a single conductor wire carried thereby, the channel portion of the frame member being formed to provide a latch shoulder, a unitary light unit mounted in the channel and having a body of insulating material, the front of said body being formed with a laterally open cavity, a lamp bulb positioned in the cavity, two contact members carried by the body and formed with cooperating portions extending into said cavity and forming a socket which supports the lamp bulb, one of the contact members having a portion extending rearwardly of the body engaging the conductor wire of the conductor strip, a lens connected to the body for covering the cavity and enclosing the lamp bulb, and a resilient latch member formed as a continuation of the other contact member and having an exposed portion abutting against said shoulder on the frame member, when the light unit is mounted in the channel, to preclude removal of the light unit, intact, from the frame member, said latch member serving to complete the electrical circuit for the light unit through said frame member.

3. A light unit for use with a conductor strip, said unit comprising a body of insulating material formed in its front face with an open cavity for a lamp bulb, the rear portion of the body being formed with a slot, and an opening interconnecting the cavity and slot, a plug of insulating material for fitting into said slot, a pair of contact members positioned on opposite sides of the plug and adapted together with the plug to be snugly fitted into said slot, said contact members each being formed adjacent one end with a pair of closely spaced resilient fingers adapted to be extended through said opening into the cavity, the two pairs of fingers being cooperatively spaced apart to provide a lamp base socket, a lamp bulb mounted in said socket, the opposite end of each of said contact members extending externally of the body, and said opposite end of one of the contact members being bent to provide a resilient latch, and a lens cover connected to the front end of the base, closing said cavity and enclosing the lamp bulb.

4. A light unit for use with a conductor strip, said unit comprising a body of insulating material formed in its front face with an open cavity for a lamp bulb, the rear portion of the body being formed with a slot, and an opening interconnecting the cavity and slot, a plug of insulating material for fitting into said slot, a pair of contact members positioned on opposite sides of the plug and adapted together with the plug to be snugly fitted into said slot, said contact members each being formed with a pair of closely spaced resilient fingers adapted to be extended through said opening into the cavity, said plug being formed with a recess in one face to provide a seat for one contact member for interlocking said member and plug against lateral movement, the two pairs of fingers being cooperatively spaced apart to provide a lamp base socket, a lamp bulb mounted in said socket, and a lens cover connected to the front end of the base, closing said cavity and enclosing the lamp bulb.

5. A light unit for mounting on a vehicle body, said unit comprising a body of insulating material formed in its front face with an open cavity for a lamp bulb, a lamp bulb mounted in the cavity, and a lens connected to the body for covering the open end of said cavity and enclosing the lamp bulb, said lens being in the general form of a section of a hollow cylindrical disc having a front wall, a flat bottom wall and an arcuate top wall, the front wall being formed with a series of concentrically arranged arcuate grooves defining light refracting surfaces, said grooves being generated about an axis located outside and below said bottom wall of the lens.

6. A light unit for mounting on a vehicle body, said unit comprising a body of insulating material formed in its front face with an open cavity for a lamp bulb, a lamp bulb mounted in the cavity, and a lens connected to the body for covering the open end of said cavity and enclosing the lamp bulb, said lens being in the general form of a section of a hollow cylindrical disc having a front wall, a flat bottom wall and an arcuate top wall, the front wall being formed with a series of concentrically arranged arcuate grooves defining light refracting surfaces, said grooves being generated about an axis located outside and below said bottom wall of the lens, and the arcuate top wall being formed on the inner surface with a series of spaced apart grooves defining lateral light refracting surfaces.

7. A light unit for mounting on a vehicle body, said unit comprising a body of insulating material formed in its front face with an open cavity for a lamp bulb, a lamp bulb mounted in the cavity, and a lens connected to the body for covering the open end of said cavity and enclosing the lamp bulb, said lens being in the general form of a section of a hollow cylindrical disc having a front wall, a flat bottom wall and an arcuate top wall, the front wall being formed with a series of concentrically arranged arcuate grooves defining light refracting surfaces, said grooves being generated about an axis located outside and below said bottom wall of the lens, and the arcuate top wall being formed on the inner surface with a series of spaced apart grooves defining lateral light refracting surfaces, said grooves in the arcuate top wall of the lens each defining a pair of flat surfaces, one extending in the general direction of the bottom wall of the lens and the other disposed at an angle of approximately thirty degrees to vertical, providing an angle between an adjacent pair of said surfaces of approximately sixty degrees.

References Cited in the file of this patent

UNITED STATES PATENTS

| | | |
|---|---|---|
| 2,025,564 | Blake | Dec. 24, 1935 |
| 2,332,766 | Von Gehr | Oct. 26, 1943 |
| 2,674,723 | Hurlbut | Apr. 6, 1954 |
| 2,853,595 | Baldwin | Sept. 23, 1958 |
| 2,908,808 | Kester et al. | Oct. 13, 1959 |
| 3,005,089 | Robbins | Oct. 17, 1961 |
| 3,015,023 | Dayton et al. | Dec. 26, 1961 |